US006840365B2

(12) United States Patent
Löffler

(10) Patent No.: US 6,840,365 B2
(45) Date of Patent: Jan. 11, 2005

(54) APPARATUS AND METHOD FOR EXAMINING OBJECTS

(75) Inventor: Friedemann Löffler, Munich (DE)

(73) Assignee: Giesecke & Devrient GmbH, Munich (DE)

(*) Notice: Subject to any disclaimer, the term of this patent is extended or adjusted under 35 U.S.C. 154(b) by 213 days.

(21) Appl. No.: 10/139,359

(22) Filed: May 7, 2002

(65) Prior Publication Data

US 2002/0170803 A1 Nov. 21, 2002

(30) Foreign Application Priority Data

May 7, 2001 (DE) ........................................ 101 22 100

(51) Int. Cl.7 ................................................ G06K 7/01
(52) U.S. Cl. ...................................................... 194/207
(58) Field of Search ................................ 194/207, 206, 194/205, 210, 211, 212, 213; 324/228, 260, 261, 262, 263; 209/534

(56) References Cited

U.S. PATENT DOCUMENTS

| | | | | |
|---|---|---|---|---|
| 3,362,532 A | | 1/1968 | Riddle et al. | 209/73 |
| 4,355,300 A | * | 10/1982 | Weber | 235/451 |
| 4,906,988 A | * | 3/1990 | Copella | 340/5.86 |
| 5,122,754 A | * | 6/1992 | Gotaas | 324/676 |
| 5,295,196 A | | 3/1994 | Raterman et al. | 382/7 |
| 5,419,424 A | | 5/1995 | Harbaugh | 194/206 |
| 6,094,147 A | * | 7/2000 | Gerz | 340/10.3 |

FOREIGN PATENT DOCUMENTS

| | | | |
|---|---|---|---|
| DE | 4447294 | 5/1996 | G01D/5/241 |
| DE | 19512921 | 10/1996 | G07D/7/00 |
| DE | 19512926 | 10/1996 | G07D/7/00 |
| DE | 19832434 | 1/2000 | G01D/5/24 |
| DE | 20107366 | 9/2001 | |
| EP | 0404975 | 1/1991 | G01D/5/24 |
| EP | 0413534 | 2/1991 | G07D/7/00 |
| GB | 2 098 768 A | 11/1982 | G06K/7/08 |

* cited by examiner

*Primary Examiner*—Donald P. Walsh
*Assistant Examiner*—Mark Beauchaine
(74) *Attorney, Agent, or Firm*—Bacon & Thomas, PLLC

(57) ABSTRACT

The invention relates to an apparatus and corresponding method for examining objects, in particular documents of value, identification or security documents, having at least one detector device (1, 10–15) for detecting at least one property of an object to be examined (5) and for generating at least one detector signal (S) corresponding to the detected property, the detector device (1, 10–15) and the object (5) being movable relative to each other in a transport direction (T) and the detector device (1, 10–15) extending over at least a partial area of the object (5).

For reliable examination of objects, in particular reliable determination of the position and/or nature of features on objects, at the same time as simple structure and simple evaluation, it is provided that the detector device (1, 10–15) has at least two extensions (A, B) of different magnitude in the transport direction (T).

17 Claims, 6 Drawing Sheets

T
3
5
1
10
11
12
13
14
S1
S2
S3

S
t
S1
S3

S
t
S1
S2
S3

S
t
S1
S2
S3
S4
S5

APPARATUS AND METHOD FOR EXAMINING OBJECTS

BACKGROUND

This invention relates to an apparatus and corresponding method for examining objects, in particular documents of value, identification or security documents, having at least one detector device for detecting at least one property of an object to be examined and for generating at least one detector signal corresponding to the detected property, the detector device and the object being movable relative to each other in a transport direction and the detector device extending over at least a partial area of the object.

An apparatus of this type is known for example from European laid-open print EP 0 413 534 A1. For checking an encoded security thread located on a bank note with magnetic or luminescent code areas positioned along said thread, the bank note is transported past an elongate detector with a transport device. The detector encloses an acute angle with the transport direction so that the individual code areas of the security thread are brought successively into the area of the detector. A suitable evaluation electronics is used to determine the encoded information from the time behavior of the detector signals.

However, this apparatus is mainly suitable for the examination of security threads. No statements in particular about the position or nature of other types of security features, such as round holograms, so-called patches, or areas with special electric, magnetic or optical properties, are permitted by the known apparatus with sufficient reliability or unless an elaborate evaluation electronics is used.

SUMMARY

It is the problem of the invention to state an apparatus and corresponding method that, while having a simple structure and simple evaluation, allow reliable examination of objects, in particular reliable determination of the position and/or nature of features in or on objects.

The invention is based on the idea that the detector device extending over at least a partial area of the object has at least two extensions of different magnitude in the transport direction. The extension of the detector device refers here to the particular width of the detector device in the transport direction and/or the particular interval in the transport direction between detector units that the detector device can include.

A feature located on or in the object, in particular a security or authenticity feature, is transported past the detector device or detector units with motion of the object in the transport direction. The feature then traverses with the object the detector device or detector units at a place where the detector device has a certain width or the detector units have certain intervals. Depending on the position and/or nature of the feature, the traversed extensions, i.e. widths or intervals, are different so that the feature is located in the area of the detector device or detector units for accordingly differently lengths of time. The duration of time, the time interval, the signal level or signal shape of the generated detector signals therefore contains information about the position and/or nature of the feature.

The detector device or detector units are preferably designed for detecting electric and/or magnetic and/or optical properties. Besides security or authenticity features, the invention can also be used to examine a great variety of other features, such as adhesive strips, inhomogeneities or impurities, on or in the object. The invention is fundamentally also suitable for recognizing double and multiple removal or for monitoring transport in bank note processing machines. In addition, the inventive apparatus can recognize codings contained in the printed image of a printed document, in the thickness of a document, e.g. in the form of thickness modulations, or in security features on or in a document.

DESCRIPTION OF THE DRAWINGS

The invention will be explained in more detail in the following with reference to examples shown in figures as follows.

FIG. 2 a) a second embodiment of the invention, and b) a diagram with corresponding detector signals;

FIG. 3 a) to d) examples of different forms of the detector device;

FIG. 4 a) a preferred embodiment of the invention, and b) a diagram with corresponding detector signals;

FIG. 5 a) a further embodiment, and b) a diagram with corresponding detector signals;

FIG. 6 a) an embodiment with five detector units, b) a diagram with corresponding detector signals, and c) a diagram with a Fourier transform of the detector signals;

FIG. 7 a) an example of an apparatus composed of a plurality of triangular detector devices, and b) and c) diagrams with corresponding detector signals;

FIG. 8 a) a further embodiment of the invention, and b) to d) diagrams with detector signals;

FIG. 9 a) an embodiment for determining the properties, in particular the width, of a security thread, and b) a diagram with corresponding detector signals.

DETAILED DESCRIPTION OF VARIOUS EMBODIMENTS

Figure 1B:
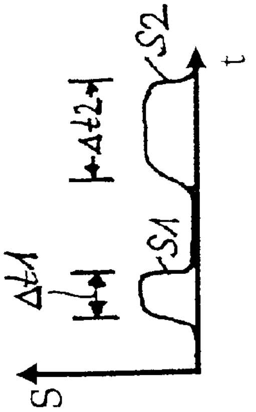
FIG. 1 a) a first embodiment of the invention, and b) a diagram with the time behavior of two detector signals.
Figure 1A:
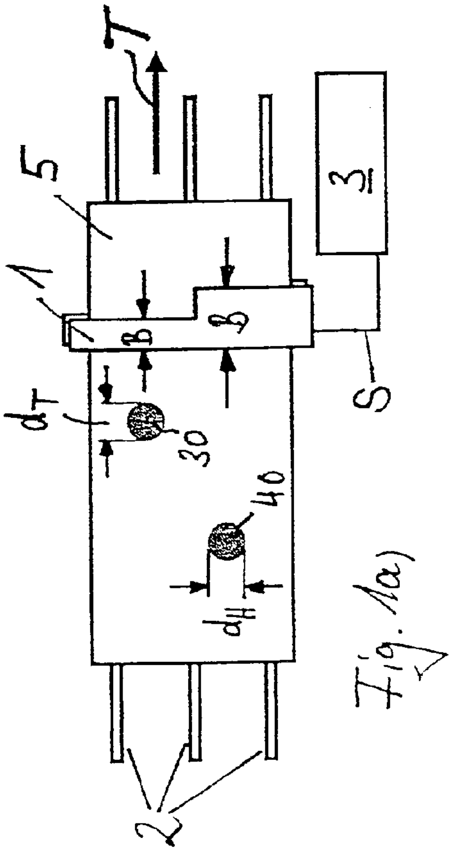

FIG. 1*a*) shows a first embodiment of the invention. Object to be examined 5, for example a document of value, identification or security document, in particular a bank note, is transported by a transport device, indicated in the shown example by transport belts 2, in transport direction T past detector device 1. On or in object to be examined 5 there are features 30 and 40, in particular authenticity or security features, with certain physical, in particular electric and/or magnetic and/or optical, properties. Said properties are detected by detector device 1 while object 5 passes detector device 1. Detector device 1 then generates detector signal S corresponding to the detected properties. From detector signal S statements can then be derived in evaluation device 3 3 about examined object 5, in particular about the nature and/or position of features 30 and 40 on object 5.

According to the invention, detector device 1 has two extensions B, i.e. widths, of different magnitude parallel to transport direction T. In the shown example, detector device 1 has a contour which is step-shaped on one side. Depending on their position on object 5, features 30, 40 traverse detector device 1 at places of different extension B, so that detector signal S generated by detector device 1 has pulses with an accordingly different duration in each case.

Detector device 1 is preferably a sensor for detecting electric and/or magnetic and/or optical properties.

In the selected example, detector device 1 constitutes one plate of a pair of capacitor plates, the second capacitor plate (indicated only schematically in the representation) being behind object 5 and having a similar form to detector device 1. Depending on the electric and/or dielectric property of an object or a feature located on or in the object, the capacitance of the capacitor changes so that corresponding detector signals can be generated.

Detector device 1 may also be an accordingly formed pole shoe that is suitable for detecting magnetic properties of the object and is in magnetic contact with a measuring coil that generates corresponding detector signals. Detector device 1 can furthermore be formed as a magnetic head wherein the gap between two pole shoes has width B varying according to the invention. It is also possible to detect magnetic fields using detection areas formed according to the invention with e.g. Hall probes or magnetoresistive resistance meters located thereon.

In addition, detector device 1 can be designed as an inventively formed detection area of an optical detector.

FIG. 1*b*) shows a diagram of the course of detector signal S generated by detector device 1 over time t. Pulses S1, S2 of different length are generated in accordance with different extensions B of detector device 1 which are traversed by features 30, 40 in transport direction T. From particular duration Δt1, Δt2 of pulses S1, S2 statements can thus be derived in simple fashion about the position of features 30, 40 on object 5. In this case, short duration Δt1 of pulse S1 indicates that feature 30 is located on the upper half of object 5, while longer duration Δt2 of pulse S2 indicates a position of feature 40 in the lower half of object 5.

Figure 2B:
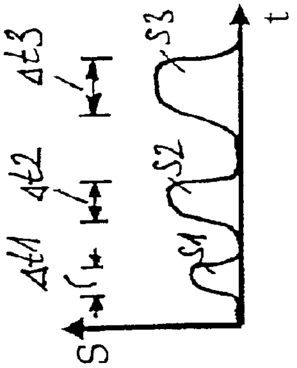
Figure 2A:
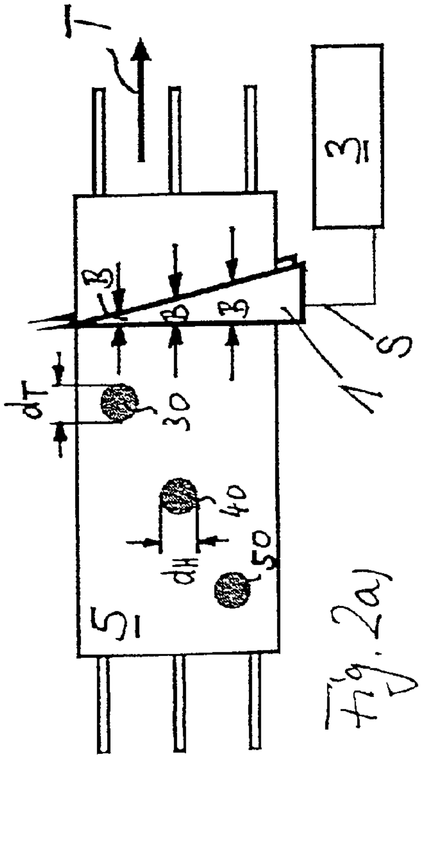

The mode of operation of the second embodiment of the invention shown in FIG. 2*a*) is analogous to that described in FIG. 1. However, the apparatus differs from that shown in FIG. 1*a*) in that detector device 1 has a continually extending contour in the form of a triangle. Analogously to FIG. 1*a*), features 30, 40, 50 with different positions on object 5 traverse extensions B of different magnitude of detector device 1.

Pulses S1, S2 and S3 of generated detector signal S as shown in the diagram in FIG. 2*b*) differ according to their duration Δt1, Δt2, Δt3 from which the position of particular feature 30, 40, 50 on object 5 can be inferred.

Detector device 1 with step-shaped contour shown in FIG. 1*a*) allows only the determination of individual positional areas in which feature 30, 40 is located on object 5. In contrast, detector device 1 with continually extending contours in the area of the sides of detector device 1 as shown in FIG. 2*a*) allows the exact determination of the position of feature 30, 40, 50 on object 5 from particular duration Δt1, Δt2, Δt3 of pulses S1, S2, S3 of detector signal S.

From detector signals S of the apparatuses of FIGS. 1*a*) and 2*a*) statements can be derived not only about the position but also about the nature, in particular the shape and/or size, of features 30, 40, 50. For example, extension $d_T$ of feature 30, 40, 50 in transport direction T can be inferred from duration Δt1, Δt2, Δt3 of pulse S1, S2, S3, and extension $d_H$ of feature 30, 40, 50 perpendicular to transport direction T from the signal level of pulses S1, S2, S3.

Figure 3:
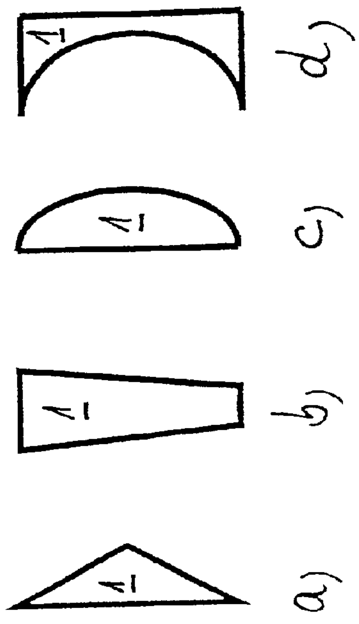

FIGS. 3*a*) to *d*) show further examples of detector devices 1 with continually extending contours. The selected examples have the form of an isosceles triangle, a trapezoid, a segment of an ellipse or an area with a concave course in the area of one side and are especially suitable for simple and reliable determination of the position and/or nature of certain features depending on the case of application.

Figure 4A:
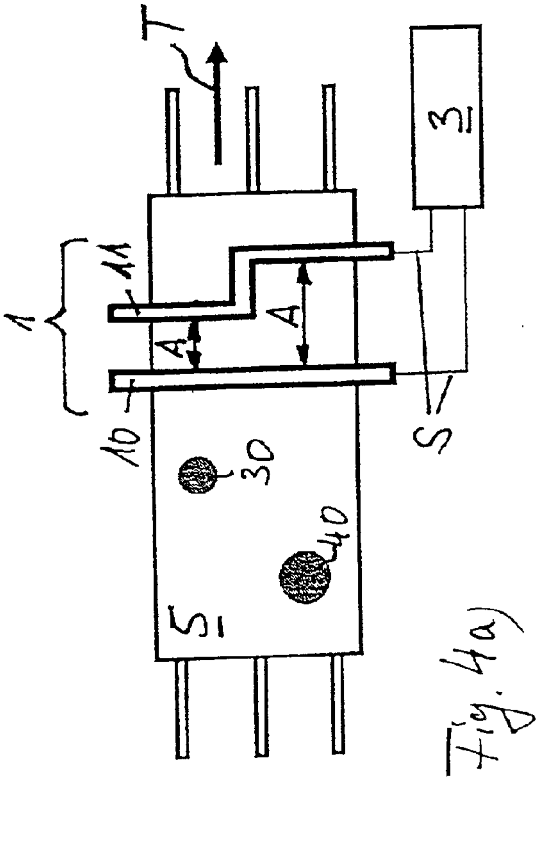

FIG. 4*a*) shows a preferred embodiment of the invention wherein detector device 1 includes two detector units 10 and 11 disposed one behind the other in transport direction T and having two intervals A of different magnitude therebetween. Each of detector units 10, 11 serves to detect properties of object 5 or features 30 and 40 located on or in object 5, and to generate at least one detector signal S corresponding to the detected properties.

Detector signals S can be combined in a common channel of evaluation device 3 or be applied to a common connection (not shown) between the detector units and evaluation device 3 before the evaluation device.

Figure 4B:
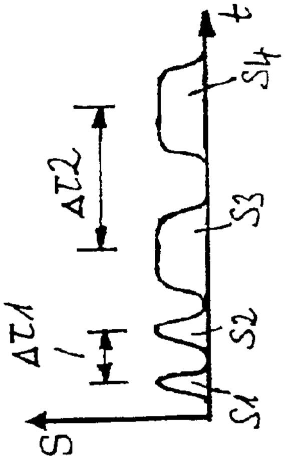

Detector signals S of the two features 30 and 40 located on object 5 are shown in the diagram of FIG. 4*b*). When feature 30, 40 passes detector units 10 and 11, the latter generate corresponding detector signals S having individual pulses S1 to S4. Pulses S1 and S2 correspond to detector signals S that feature 30 causes when passing detector units 10, 11, while pulses S3 and S4 are caused analogously by feature 40.

The duration of individual pulses S1 to S4 depends primarily on the particular width of detector unit 10, 11 and the extension of feature 30, 40 in transport direction T. From the duration of pulses S1 and S2, S3 and S4 the nature of features 30, 40, in particular their extension-in transport direction T, can therefore be inferred, analogously to the examples described in FIGS. 1*a*) and 2*a*).

Time interval Δτ1, Δτ2 of particular pulses S1 and S2, S3 and S4 generated by feature 30, 40 is dependent on the position of particular feature 30, 40 on object 5 perpendicular to transport direction T. In the shown example the position of feature 30, 40 on object 5 can therefore be inferred in simple fashion by determining time interval Δτ1, Δτ2 of two pulses S1 and S2, S3 and S4.

Figure 5A:
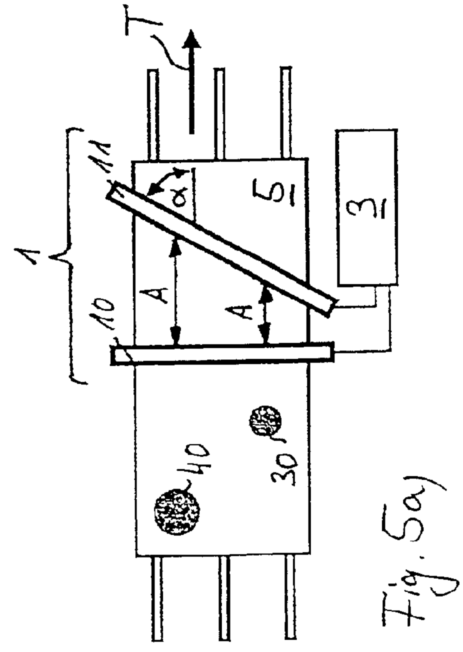
Figure 5B:
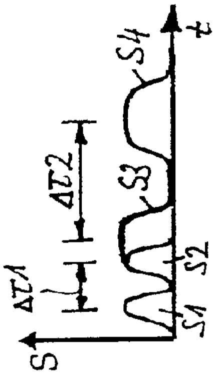

FIG. 5*a*) shows a development of the embodiment shown in FIG. 4*a*). Instead of step-shaped detector unit 11, elongate detector unit 11 is disposed in this example so as to enclose acute a with transport direction T. In analogy to the example described in FIG. 4*b*), the position of feature 30, 40 on object 5 can also be determined in this embodiment from time intervals ΔT1, ΔT2 of individual pulses S1 and S2, S3 and 54 of detector signals S shown in FIG. 5*b*). From the duration of pulses S1 and 83, 82 and 84 statements can in addition be derived about the nature of features 30, 40 in particular their extension in transport direction T. The intervals A may vary between at least two detector units 10, 11 and the plane of the object 5. This feature is particularly evident in view of FIG. 5*a* wherein the interval A is shown with arrows denoting the variability of such intervals A between detector unit 10 and detector unit 11.

Figure 6A:
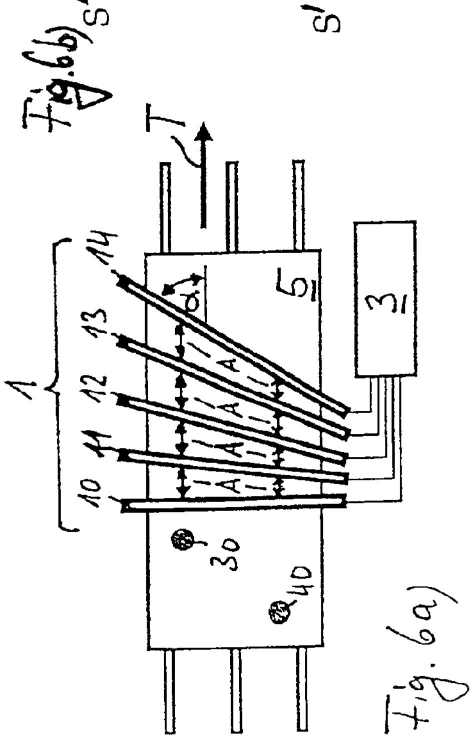
Figure 6B:
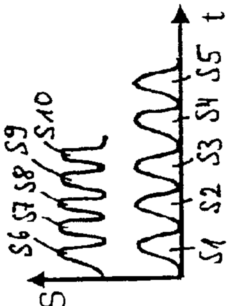

FIG. 6*a*) shows a further embodiment of the apparatus shown in FIG. 5*a*). In this example, five detector units 10 to 14 are disposed one behind the other and enclose different angles a with transport direction T. Individual detector devices 10 to 14 are preferably disposed so as to have equal intervals A therebetween at a fixed height in transport direction T. Due to this equidistant arrangement of detector devices 10 to 14, corresponding detector signals S have pulses S1 to S5, S6 to S10 with equal time intervals. This is shown in FIG. 6*b*). For reasons of clarity, pulses S6 to S10 have been shifted by a constant value to higher signals in the selected representation. Feature 30 passes individual detector units 10 to 14 at a height where the latter have greater interval A therebetween than is the case at the height of feature 40. The time intervals of pulses S1 to S5 shown in FIG. 6*b*) are accordingly greater in comparison to pulses S6 to S10. As described above in connection with FIGS. 4*b*) and 5*b*), the position, i.e. the height perpendicular to transport direction T, of particular feature 30, 40 on object 5 can be determined from the particular time intervals of the pulses.

Figure 6C:
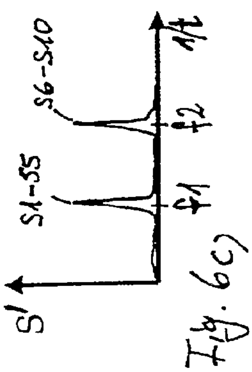

An advantageous way of evaluating detector signals S is a Fourier analysis of detector signals S. This method is of advantage in particular when detector signals S are superimposed by disturbances or strong noise. For this purpose, Fourier transformation of particular detector signals S is used to generate transformed detector signals S' from which e.g. fundamental frequency $f$1, $f$2 of pulses S1 to S5, S6 to S10 of detector signal S can be determined in simple fashion. FIG. 6*c*) shows transformed detector signals S' in the area of fundamental frequencies $f$1 and $f$2 of the particular train of pulses S1 to S5, S6 to S10. Fundamental frequencies $f$1, $f$2 determined from transformed detector signal S' can then be used as a measure of the time interval of individual pulses S1 to S5, S6 to S10 for determining the position of features 30, 40. In this way an especially reliable positional determination of features 30, 40 is obtained. In addition, trans-In addition, transformed detector signals S' can be analyzed in the area of frequencies above the particular fundamental frequency, in particular of integral multiples of the fundamental frequency, and statements about the shape and/or size of the features derived therefrom.

Figures 7A, 7B, 7C:
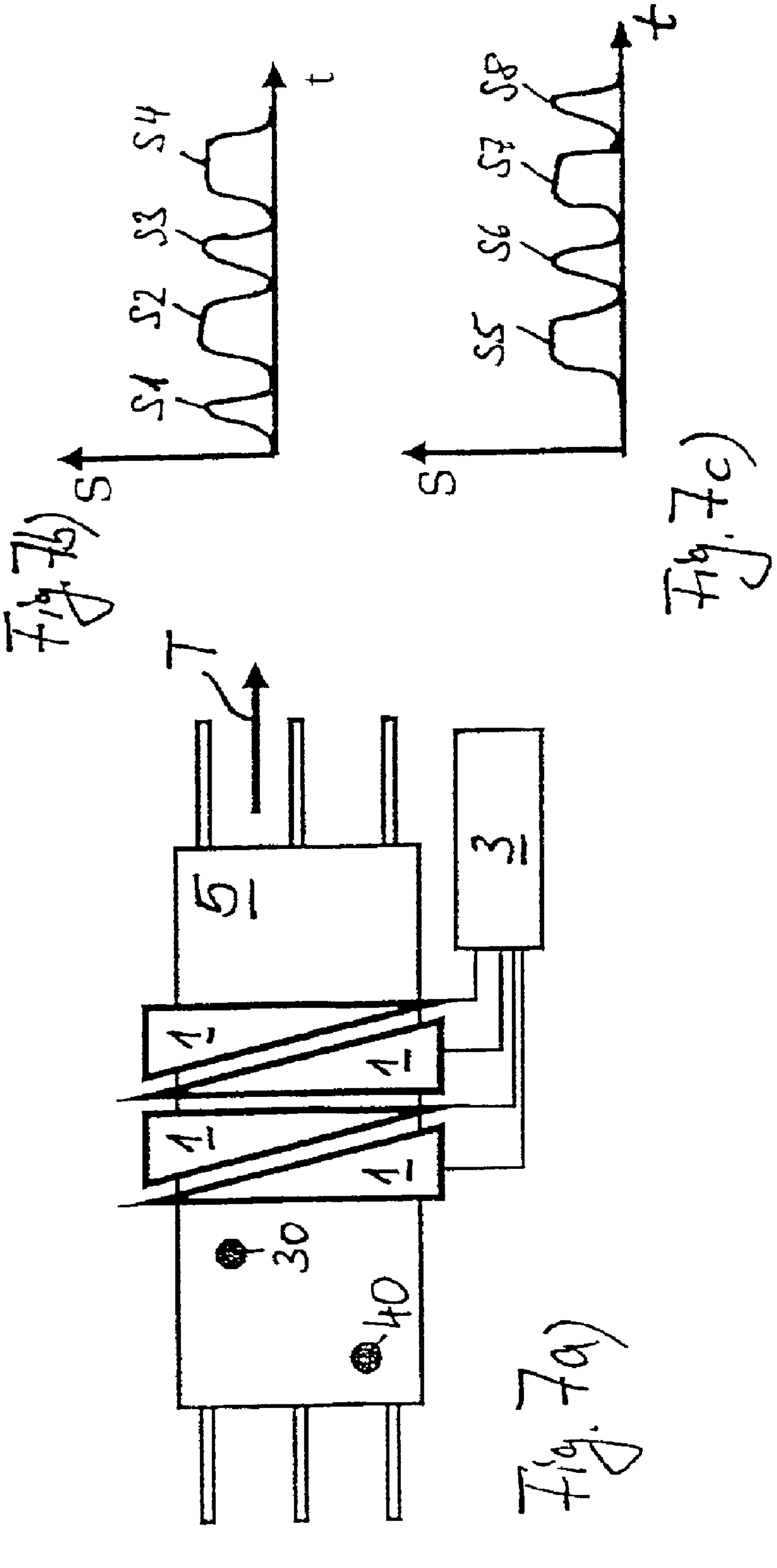

FIG. 7*a*) shows an example of an inventive apparatus comprising four detector devices 1. Individual detector devices 1 each have the form of a triangle and are designed for generating detector signals S from which the position of features 30, 40 on object 5 can be determined analogously to the example described in FIG. 2. In addition, this embodiment of the invention permits the position of particular feature 30, 40 to be inferred from the temporal sequence of individual pulses S1 to S4, S5 to S8 (FIGS. 7*b* and 7*c*) of different temporal length. In particular, the exact position of feature 30, 40 on object 5 can be inferred from the difference or ratio of pulses of different duration, e.g. S1 and S2 or S2 and S3 or S3 and S4. Fourier analysis is fundamentally also possible in this embodiment in order to filter periodic components out of the generated pulse train and derive therefrom statements about the position and/or nature of features 30, 40. In the embodiment shown in FIG. 7*a*) four identical detector devices 1 are combined. It is fundamentally also possible to assemble an apparatus from detector devices 1 of different shape and/or size. The interval between detector devices 1 can also be of variable design. A "puzzle-like" structure of the apparatus composed from a plurality of detector devices 1 is also generally possible.

Figures 8A, 8B, 8C, 8D:
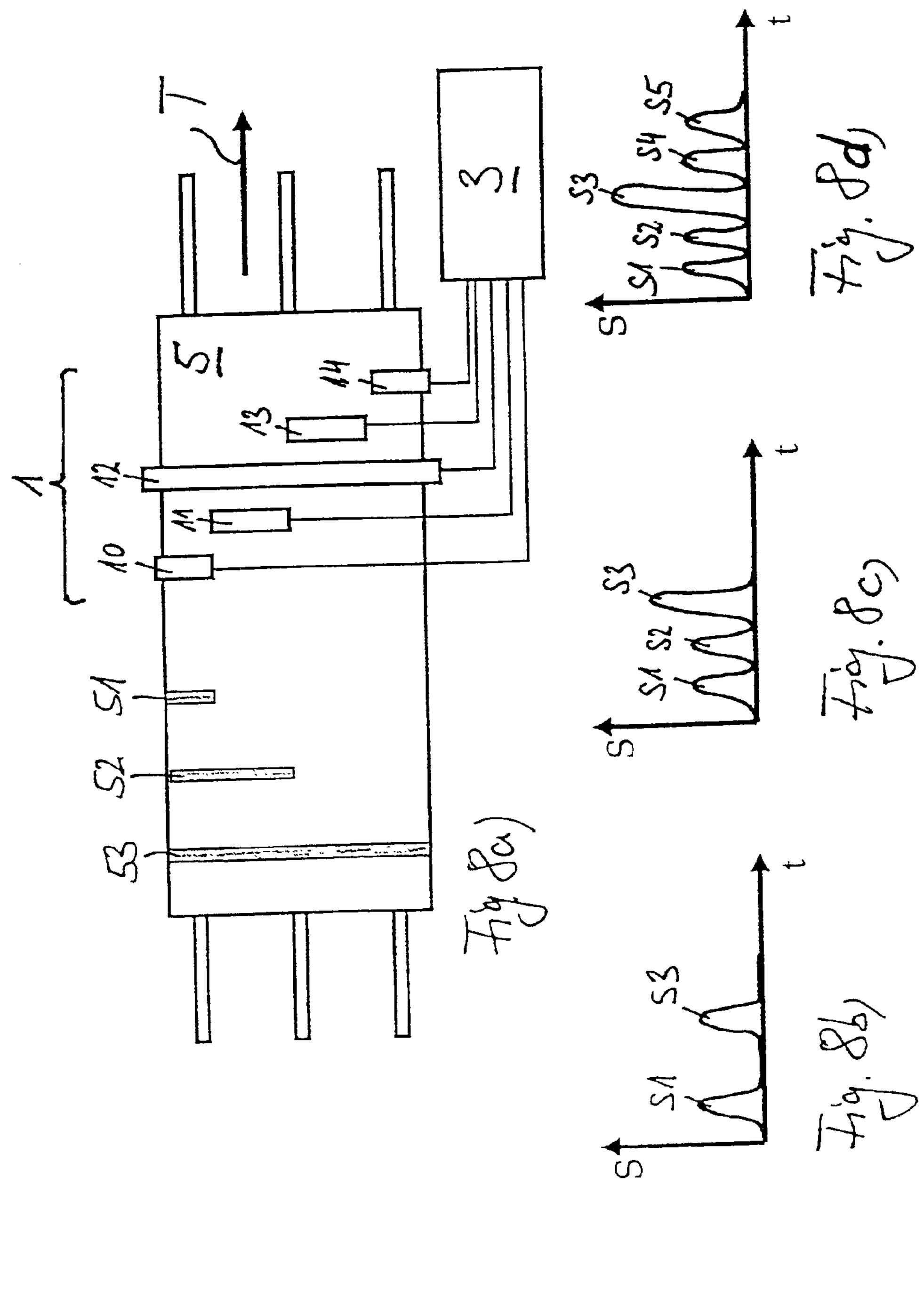

FIG. 8*a*) shows an embodiment of the inventive apparatus that is designed in particular for examining the extension of individual features 51, 52, 53 perpendicular to transport direction T and is therefore particularly suitable for examination of security threads. Individual detector units 10 to 14 each extending over a part of object 5 are disposed one behind the other in transport direction T and shifted perpendicular to transport direction T. Only detector unit 12 disposed in the middle of detector device 1 extends completely over object to be examined 5. To further increase the information content of detector signals S, individual detector units, e.g. 11 and 13, can partly overlap perpendicular to transport direction T.

In analogy to the embodiments described in FIGS. 4 and 5, the position of a feature on object 5 can in this example also be determined from the time interval of detector signals S generated by individual detector units 10 to 14. In addition, statements about the extension of features 51, 52 and 53 perpendicular to transport direction T can be derived from detector signals S, as will be illustrated with reference to detector signals S shown in FIGS. 8*b*) to *d*). Thus, feature 51 causes only pulses S1 and S3 to be generated in detection units 10 and 12, thereby obtaining the pattern of detector signal S shown in FIG. 8*b*). When the two other features 52, 53 pass detector device 1, detector signals S shown in FIGS. 8*c*), 8*d*) are generated. Statements about the extension of individual features 51 to 53 perpendicular to transport direction T can therefore be derived in simple fashion from the presence of individual pulses S1 to S5 in detector signal S. This embodiment of the invention is especially suitable for example for examining objects with interrupted features, such as bank notes with interrupted security threads.

Figure 9A:
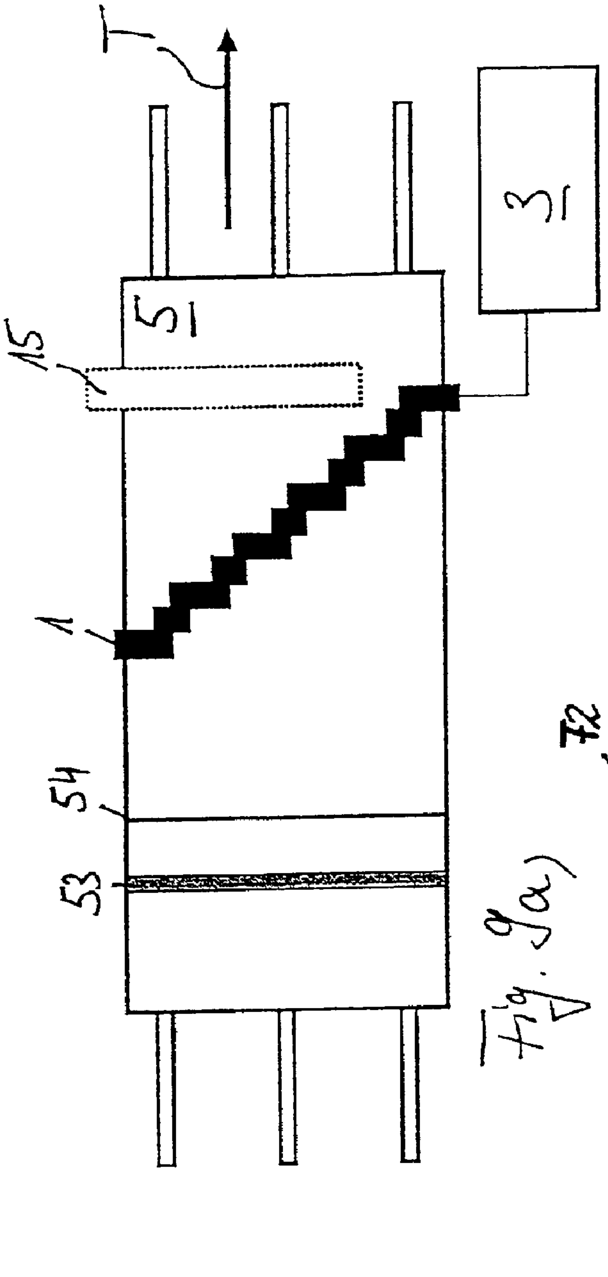

FIG. 9*a*) shows a further embodiment of the invention that is of advantage in particular for examining elongate features, such as security threads on bank notes. Detector device 1 is of steplike design, the step heights extending perpendicular to transport direction T being variable from one step to the next. Analogously to the embodiment shown in FIG. 4*a*), detector unit 15 extending substantially perpendicular to transport direction T can additionally be provided, being indicated by dashed lines in the shown example, in order to additionally obtain information about the position of features on object 5 for example.

Figure 9B:
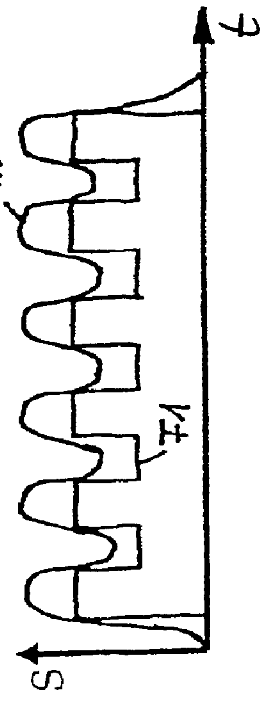

The diagram shown in FIG. 9*b*) shows the time behavior of detector signal S generated by detector device 1 for two security threads 53 and 54 of different width. Pulse train F1 corresponds to detector signal S that thin security thread 54 would cause when passing detector device 1. Wider security thread 53 results in accordingly changed detector signal S with pulse train F2 that is shifted by a certain amount to greater values of the detector signal due to the greater lateral overlap of adjacent steps and in addition has a less angular course due to the less abrupt rise or fall in the transition area from one step to the next. The width of particular security thread 54, 53 can in this case also be inferred by Fourier analysis of pulse trains F1, F2. In particular those components those components in the Fourier spectrum are of interest which are located in the area of a multiple of the fundamental frequency of pulse trains F1, F2. The particular frequency and/or strength of these so-called harmonics can then be used to determine the width of examined security thread 53, 54.

In the shown examples the detector signals have been evaluated in particular with reference to the duration, the time interval or the signal level and/or shape of pulses of the detector signal. However, it is also possible within the scope of the invention to evaluate the detector signals with consideration of a variation of the detector signal, e.g. by differentiating the detector signal, an integral of the detector signal or a combination thereof over a certain time period, and to derive therefrom corresponding statements about the position and/or nature of features.

What is claimed is:

1. An apparatus for examining objects, for example documents of value and identification or security documents, comprising:

at least one detector device arranged to detect at least one property of an object to be examined, and to generate at least one detector signal corresponding to the detected property, the detector device and the object being movable relative to each other in a transport direction, and the detector device extending over at least a partial area of the object the detector device having at least two extensions of different magnitude in the transport direction;

wherein the detector device includes at least two detector units disposed one behind the other in the transport direction and having at least two intervals of different magnitude therebetween in the transport direction, the detector units each enclosing different angles relative to the transport direction.

2. The apparatus according to claim 1, wherein the detector device (1, 10–15) has a contour with a step-shaped course in at least a partial area of the object (5).

3. The apparatus according to claim 1, wherein the detector device (1, 10–15) has a contour with a continual course in at least a partial area of the object (5).

4. The apparatus according to claim 3, wherein the continually extending contour has a continually decreasing or increasing extension (B).

5. The apparatus according to claim 3, wherein the detector device has a form selected from the group consisting of a polygonal form, preferably the form of a triangle or trapezoid, and a round form, preferably the form of a segment of an ellipse or circle.

6. The apparatus according to claim 1, wherein at least one detector unit is oriented perpendicular to the transport direction, and at least one detector unit encloses an acute angle relative to the transport direction.

7. The apparatus according to claim 1, wherein the detector device (1, 10–15) or at least one detector unit (10–15) is inclined by an acute angle relative to a plane of the object.

8. The apparatus according to claim 1, wherein the interval varies between at least two detector units and the plane of the object.

9. The apparatus according to claim 1, including an evaluation device (3) arranged to determine the position of a feature (30, 40, 50–53) on the object (5) and/or the nature, preferably the shape and/or size, of a feature (30, 40, 50–54) from the detector signal (S).

10. The apparatus according to claim 9, wherein the evaluation device (3) is arranged to determine the position or nature, preferably the shape and/or size, of the feature (30, 40, 51–54) from the duration (Δt1, Δt2, Δt3) and/or the time interval (Δt1, Δt2) of pulses (S1–S8) comprising the detector signal (S).

11. The apparatus according to claim 1, wherein the evaluation device (3) is arranged to perform a Fourier analysis of the detector signal (S).

12. The apparatus according to claim 1, wherein the detector device (1, 10–15) is arranged to detect electric and/or magnetic and/or and/or optical properties of the object and/or a feature (30, 40, 51–54) located in or on the object (5).

13. A method for examining objects, for example documents of value, identification or security documents, comprising the steps:

moving an object to be examined and a detector device relative to each other in a transport direction, the detector device including at least two detector units disposed one behind the other in the transport direction and having at least two intervals of different magnitude therebetween in the transport direction, the detector units each enclosing different angles relative to the transport direction, detecting via the detector device at least one property of the object to be examined and generating at least one detector signal corresponding to the detected property, and moving the object relative to at least two extensions of different magnitude of the detector device in the transport direction, including traversing the detector device by a feature located on or in the object in the area of at least one of the extensions, and generating a detector signal corresponding to the traversed extension.

14. The method according to claim 13, wherein the position of the feature on the object and/or the nature, in particular the shape and/or size, of the feature is determined from the detector signal.

15. The method according to claim 14, wherein the position or nature, in particular the shape and/or size, of the feature is determined from the duration and/or the time interval of pulses comprising the detector signal.

16. The method according to claim 13, including performing a Fourier analysis on the detector signal (S).

17. The method according to claim 13, wherein the detector device detects electric and/or magnetic and/or optical properties of the object and/or the feature located in or on the object.

* * * * *